United States Patent
Kobayashi

(10) Patent No.: US 7,016,114 B1
(45) Date of Patent: Mar. 21, 2006

(54) DIFFRACTION OPTICAL DEVICE AND OPTICAL SYSTEM INCLUDING SAME

(75) Inventor: Shuichi Kobayashi, Yokohama (JP)

(73) Assignee: Canon Kabushiki Kaisha, Tokyp (JP)

(*) Notice: Subject to any disclaimer, the term of this patent is extended or adjusted under 35 U.S.C. 154(b) by 0 days.

(21) Appl. No.: 09/685,042

(22) Filed: Oct. 10, 2000

(30) Foreign Application Priority Data

Oct. 12, 1999 (JP) .................................. 11/290057

(51) Int. Cl.
*G02B 5/18* (2006.01)
*G02B 27/44* (2006.01)

(52) U.S. Cl. .................... 359/576; 359/566; 359/673; 359/692

(58) Field of Classification Search ................ 359/558, 359/565, 566, 569, 570, 15, 16, 19, 740, 359/742, 673, 576, 674; 355/30, 53; 259/569
See application file for complete search history.

(56) References Cited

U.S. PATENT DOCUMENTS

| | | | | |
|---|---|---|---|---|
| 4,390,279 A | * | 6/1983 | Suwa .......................... 356/401 |
| 5,044,706 A | * | 9/1991 | Chen .......................... 359/357 |
| 5,148,314 A | * | 9/1992 | Chen .......................... 359/642 |
| 5,170,207 A | | 12/1992 | Tezuka et al. ................ 355/53 |
| 5,229,880 A | * | 7/1993 | Spencer et al. ............. 359/353 |
| 5,253,087 A | * | 10/1993 | Yang ............................ 359/18 |
| 5,631,779 A | * | 5/1997 | Kashima ..................... 359/742 |
| 5,636,000 A | * | 6/1997 | Ushiba et al. ................ 355/30 |
| 5,790,321 A | | 8/1998 | Goto .......................... 359/742 |
| 5,847,877 A | | 12/1998 | Imamura et al. ............ 359/566 |
| 5,864,381 A | * | 1/1999 | Neal et al. .................. 351/201 |
| 5,995,279 A | | 11/1999 | Ogino et al. ................ 359/355 |
| 5,999,327 A | * | 12/1999 | Nagaoka ..................... 359/654 |
| 5,999,334 A | * | 12/1999 | Kohno ........................ 359/736 |
| 6,018,414 A | * | 1/2000 | Chipper ...................... 359/356 |
| 6,052,234 A | * | 4/2000 | Mukai et al. ................ 359/643 |
| 6,067,196 A | * | 5/2000 | Yamamoto et al. ......... 359/565 |
| 6,097,547 A | * | 8/2000 | Ogata et al. ................ 359/637 |
| 6,104,533 A | * | 8/2000 | Clark et al. ................. 359/566 |
| 6,157,488 A | * | 12/2000 | Ishii ........................... 359/569 |
| 6,301,062 B1 | * | 10/2001 | Ohmori et al. ............. 359/733 |

FOREIGN PATENT DOCUMENTS

| | | |
|---|---|---|
| JP | 4-213421 | 8/1992 |
| JP | 4-214516 | 8/1992 |
| JP | 6-324262 | 11/1994 |
| JP | 9-127322 | 5/1997 |
| JP | 10-133149 | 5/1998 |

(Continued)

OTHER PUBLICATIONS

M.W. Farn, et al., "Diffractive Doublet Corrected On-Axis at Two Wavelengths," *Proceedings of the SPIE: International Lens Design Conference*, vol. 1354, Jun. 11-14, 1990, pp. 24-29.

(Continued)

*Primary Examiner*—Audrey Chang
(74) *Attorney, Agent, or Firm*—Fitzpatrick, Cella, Harper & Scinto

(57) ABSTRACT

A diffraction optical device includes a first diffraction element and a second diffraction element arranged adjacent to each other. One of the first diffraction element and the second diffraction element has a positive power, and the other has a negative power. The first diffraction element reduces the incident angle of light upon the second diffraction element. As a result, a lowering of diffraction efficiency due to the dependency thereof upon the incident angle of light is suppressed, and flare light is prevented from occurring due to diffracted light of unnecessary orders.

4 Claims, 7 Drawing Sheets

FOREIGN PATENT DOCUMENTS

JP          11-223717          8/1999

OTHER PUBLICATIONS

C. Londoño, et al., "The Design of Achromatized Hybrid Diffractive Lens Systems," *Proceedings of the SPIE: International Lens Design Conference*, vol. 1354, Jun. 11-14, 1990, pp. 30-37.

A.D. Lathman, et al., "Binary Optics in Lens Design", Proceedings of the SPIE: International Lens Design Conference, vol. 1354, Jun. 11-14, 1990, pp. 297-309.

A.P. Wood, "Using hybrid refractive-diffractive elements in infrared Petzval objectives", Proceedings of the SPIE: International Lens Design Conference, vol. 1354, Jun. 11-14, 1990, pp. 316-323.

* cited by examiner ( REFRACTIVE INDEX nd=1.513, ABBE'S NUMBER vd=50.08 )

DIFFRACTION OPTICAL DEVICE AND OPTICAL SYSTEM INCLUDING SAME

BACKGROUND OF THE INVENTION

1. Field of the Invention

The present invention relates to a diffraction/optical device and an optical system including the diffraction optical device. More particularly, the present invention is intended to realize a diffraction optical device capable of suppressing the occurrence of flare light due to diffracted light of unnecessary orders, and an optical system including the diffraction optical device.

2. Description of the Related Art

Hitherto, there is known a method for reducing chromatic aberration by combining plural kinds of glass materials with each other. Another advanced method for reducing chromatic aberration by providing a diffraction optical device 3, which develops a diffraction action, on a lens surface or in part of an optical system is disclosed in the literature of SPIE Vol. 1354 International Lens Design Conference (1990), Japanese Patent Laid-Open No. 4-213421 and No. 6-324262, U.S. Pat. No. 5,044,706, etc. This method for reducing chromatic aberration is based on the physical phenomenon that a refracting surface and a diffracting surface in an optical system develop chromatic aberration in opposing directions for light of a certain reference wavelength.

Further, providing a diffraction optical device is greatly effective in reducing the aberration of an optical system because the diffraction optical device is able to function similarly to an aspherical lens by changing the grating pitch so that its diffractive power is partly changed.

While in a refraction optical system one ray of light remains as it is after being refracted, one ray of light is divided into plural rays of diffracted light of different orders in a diffraction optical system. In the case of employing a diffraction optical device in a lens system, therefore, the structure of a grating must be determined such that light in the wavelength range to be used is concentrated in one particular order (referred to also as the "design order" hereinafter). By concentrating diffracted light in the design order, diffracted light of other orders has a low intensity and can be regarded as being absent if the intensity is zero.

If rays of diffracted light of orders other than the design order are present, those light rays are focused in positions different from that in which the ray of diffracted light of the design order is focused, and hence generate flare light that is out of focus with respect to the design image plane. For this reason, in an optical system utilizing the diffraction effect, it is important to pay due consideration to the spectral distribution obtained with the diffraction efficiency for diffracted light of the design order and the behavior of diffracted light of orders other than the design order. Thus, to effectively utilize the color-aberration compensating effect of a diffraction optical device having the above-mentioned properties, it is required that the diffraction efficiency for diffracted light of the design order is sufficiently high over the entire wavelength range to be used, an diffracted light is substantially concentrated in the design order.

FIG. 7B shows a characteristic of the diffraction efficiency resulting when a diffraction optical device shown in FIG. 7A is formed on a certain surface in an optical system.

In the following description, the value of the diffraction efficiency is defined by the ratio of the amount of diffracted light of each order to the total amount of light passing the diffraction optical device. For brevity of explanation, however, light reflected by the boundary surface of a grating, etc., are not taken into consideration in calculating the value of the diffraction efficiency. In FIG. 7B, the horizontal axis represents wavelength and the vertical represents diffraction efficiency.

The diffraction optical device comprises a grating with a pitch (period) of 200 $\mu$m and a height of 1 $\mu$m. The grating is made of a material having a refractive index nd=1.513 and the Abbe's number vd=50.08. The grating has a glazed structure as shown in FIG. 7A. The graph of FIG. 7B indicates the diffraction efficiency when the incident angle is zero (0 degree). This diffraction optical device is designed such that the diffraction efficiency in the wavelength range to be used is maximized for diffracted light of 1-order (indicated by a solid line in FIG. 7B). In other words, the design order 1-order. FIG. 7B also represents the diffraction efficiency for light of orders around the design order (1-order ±one order, i.e., 0- and 2-order indicated respectively by a broken line and a one-dot-chain line in FIG. 7B).

As shown in FIG. 7B, the diffraction efficiency for light of the design order is maximized at a certain wavelength (design wavelength) and is gradually lowered as the wavelength departs away from the design wavelength. Corresponding to a lowering of the diffraction efficiency for light of the design 1-order, diffracted light of other orders (0- and 2-orders, etc.) occurs and gives rise to unwanted flare light.

Japanese Patent Laid-Open No. 9-127322 discloses an arrangement capable of suppressing a lowering of the diffraction efficiency at wavelengths other than the design wavelength. With this related art, high diffraction efficiency is realized over the entire visible range by selecting three kinds of materials and two different grating thickness in optimum combinations, and arranging a plurality of gratings in an adjacently superimposed relation with an equal pitch distribution.

Another arrangement capable of suppressing a lowering of the diffraction efficiency is disclosed in Japanese Patent Laid-Open No. 10-133149. Gratings are superimposed one above the other to have a two-layered sectional shape. High diffraction efficiency is realized over the entire visible range by optimizing the refractive indexes of materials of the two-layered gratings, the dispersion characteristics thereof, and the thickness of reach grating.

According to the techniques disclosed in the above-cited publications, a diffraction optical device is made of two or more kinds of materials having different dispersion characteristics to reduce phase shifts occurring at wavelengths other than the design wavelength when light passes the diffraction optical device. As a result, the dependency of diffraction efficiency of the diffraction optical device upon wavelengths is greatly suppressed.

By arranging the diffraction optical device in a refraction optical system, color aberration can be reduced to a large extent based on the physical phenomenon that the direction of dispersion of the diffraction optical device is opposed to that of a refraction optical device. It is also possible to compensate for other aberrations by utilizing the above-mentioned effect that the diffraction optical device is able to function similarly to an aspherical lens.

In the diffraction optical device of the related art, however, the grating has a large depth and the dependency of diffraction efficiency upon the incident angle of light upon the diffraction optical device is increased. This raises the problem that the diffraction efficiency is greatly reduced depending upon the layout of the diffraction optical device in the optical system.

Particularly, when an air layer is formed between two gratings made of materials different from each other as disclosed in Japanese Patent Laid-Open No. 11-223717, the flexibility in the selection of the grating materials is greater than that in the diffraction optical device disclosed in the above-cited Japanese Patent Laid-Open No. 10-133149, but the dependency of diffraction efficiency upon the incident angle of light is further increased.

SUMMARY OF THE INVENTION

Accordingly, it is an object of the present invention to provide a diffraction optical device capable of suppressing a lowering of diffraction efficiency due to the dependency thereof upon the incident angle of light, and an optical system including the diffraction optical device.

To achieve the above object, the present invention provides a diffraction optical device comprising a first diffraction element and a second diffraction element arranged adjacent to each other, wherein one of the first diffraction element and the second diffraction element has a positive power, the other has a negative power, and the first diffraction element reduces the incident angle of light upon the second diffraction element.

Further, the present invention provides a diffraction optical device comprising a first diffraction element and a second diffraction element arranged adjacent to each other, wherein the first diffraction element and the second diffraction element have blazed gratings having blazed shapes oriented in opposing directions, and the first diffraction element reduces the incident angle of light upon the second diffraction element.

Preferably, the first diffraction element and the second diffraction element are made of materials having dispersion characteristics different from each other.

Preferably, an air layer is interposed between the first diffraction element and the second diffraction element, or the first diffraction element and the second diffraction element are arranged in an intimate contact relation.

Preferably, the light is a ray of off-axis primary light propagating through an optical system in which the diffraction elements are disposed.

Preferably, the diffraction elements are formed to have high diffraction efficiency for diffracted light of a particular order over the entire wavelength range to be used in the optical system.

To achieve the above object, the present invention also provides an optical system comprising the diffraction optical device set forth above, and a refraction optical device.

Preferably, the wavelength range to be used in the optical system is a visible range.

Preferably, the optical system further comprises an iris, wherein a first diffraction element of the diffraction optical device has a positive power, a second diffraction element of the diffraction optical device has a negative power, and the diffraction optical device is arranged in a position nearer to an image than the iris.

Preferably, the optical system further comprises an iris, wherein a first diffraction element of the diffraction optical device has a negative power, a second diffraction element of the diffraction optical device has a positive power, and the diffraction optical device is arranged in a position nearer to an object than the iris.

Further objects, features and advantages of the present invention will become apparent from the following description of the preferred embodiments with reference to the attached drawings.

DESCRIPTION OF THE PREFERRED EMBODIMENTS

Embodiments of the present invention will be described below.

First Embodiment

Figure 1A:
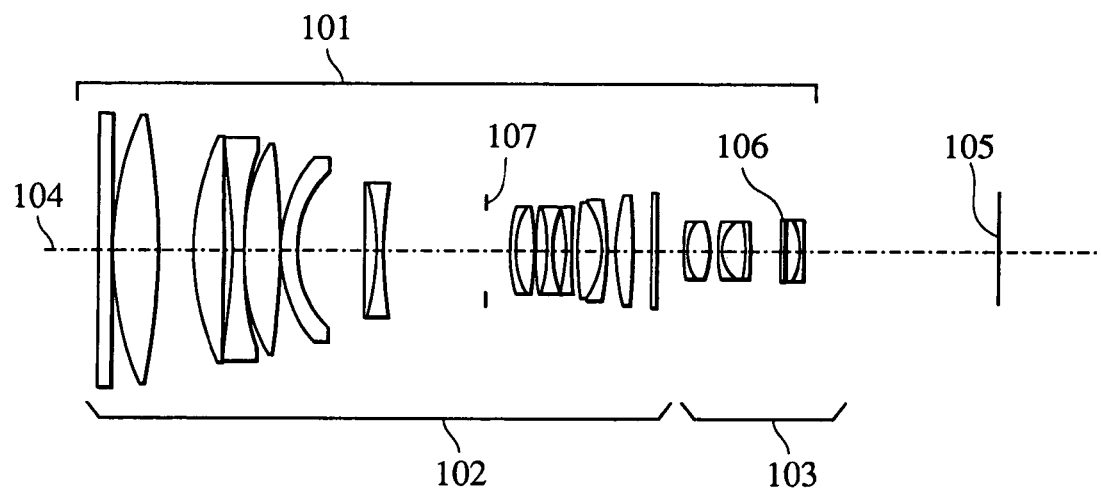
FIG. 1A is a sectional view of an optical system according to a first embodiment of the present invention, and FIG. 1B schematically shows the structure of a diffraction optical device.

FIG. 1A is a sectional view of an optical system according to a first embodiment of the present invention.

This embodiment represents the case where a diffraction optical device is employed in an extender for a photographic lens.

In FIG. 1A, numeral 101 denotes an overall optical system comprising a master lens 102, an extender 103, and an iris 107. Numeral 105 denotes an image plane and 104 denotes an optical axis. A diffraction optical device 106 is provided within the extender 103.

Figure 1B:
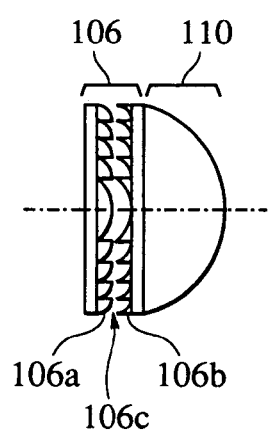

FIG. 1B schematically shows the structure of the diffraction optical device according to this embodiment. As shown in FIG. 1B, a first diffraction element 106a having a positive power (power $\psi=1/f$: f is the focal length) and a second diffraction element 106b having a negative power are arranged adjacent to each other with an air layer 106c interposed between them. The first diffraction element 106a having a positive power is arranged on the side nearer to an object (i.e., on the light incident side of the air layer).

In FIG. 1B, grating portions of the two diffraction elements 106a, 106b are illustrated in an enlarged scale for clearly showing an arrangement that two gratings (kinoforms) of the diffraction elements 106a, 106b have blazed shapes oriented in opposing directions.

As with the other lenses of the optical system 101, the diffraction optical device 106 has a structure rotationally symmetrical about the optical axis 104. As shown, the two diffraction elements 106a, 106b of the diffraction optical device 106 are each formed on a flat surface of a base plate, and the diffraction optical device 106 is joined to a lens 110. In the optical system of this embodiment, the incident angle of light upon the diffraction optical device 106 is increased as the image height increases.

Figure 2:
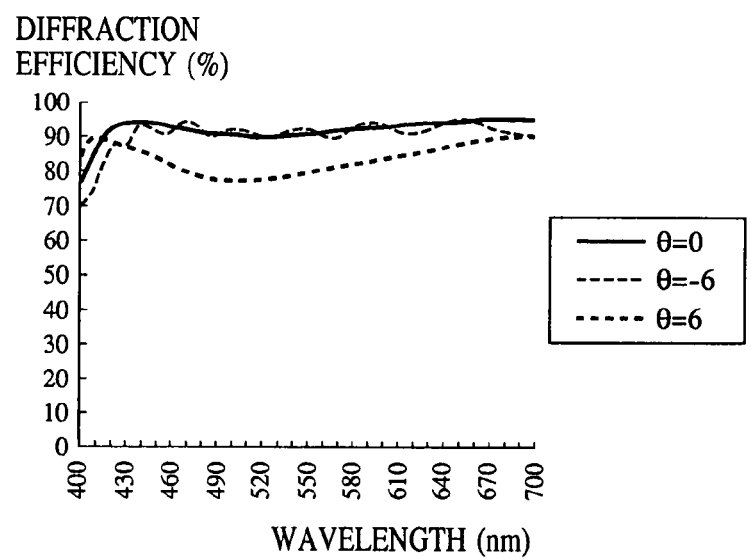
FIG. 2 is a graph showing the diffraction efficiency of the diffraction optical device according to the first embodiment of the present invention.
Figure 2:
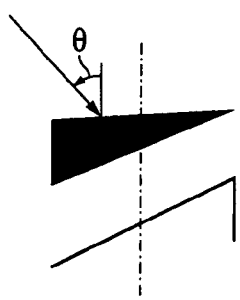

FIG. 2 is a graph showing the diffraction efficiency of the diffraction optical device. The graph of FIG. 2 indicates the diffraction efficiency resulting when the incident angle is 0, +6 and −6 degrees. The diffraction efficiency is represented by a percentage normalized based on the amount of light having passed the diffraction optical device. As seen from FIG. 2, the dependency of diffraction efficiency upon wavelengths is not the same and is asymmetrical between the case of the incident angle being +6 degrees and the case of the incident angle being −6 degrees. In this embodiment wherein the diffraction optical device 106 having the above-described construction is arranged in the refraction optical system, taking into account the incident angle of off-axis light upon the diffraction optical device 106, the first diffraction element 106a having a positive power is arranged on the side nearer to the object as shown in FIG. 1B. This arrangement is effective to reduce the incident angle of light upon the second diffraction element 106b having a negative power and arranged on the side nearer to the image plane.

The diffraction efficiency shown in FIG. 2 represents the cases where the incident angle 0 is set to 0, +6 and −6 degrees. When the incident angle is smaller than +6 degrees, the asymmetry in the dependency of diffraction efficiency upon wavelengths is reduced. Also, as the incident angle increases from ±6 degrees, the asymmetry in the dependency of diffraction efficiency upon wavelengths is increased. In the case where the incident angle of light upon the diffraction optical device 106 is positive, the incident angle of light upon the second diffraction element 106b on the exit side is reduced by the first diffraction element 106a on the entrance side, and therefore the asymmetry in diffraction efficiency between the positive incident angle and the negative incident angle is lessened as compared with the case where the incident angle of light upon the diffraction optical device 106 is negative.

Figure 3:
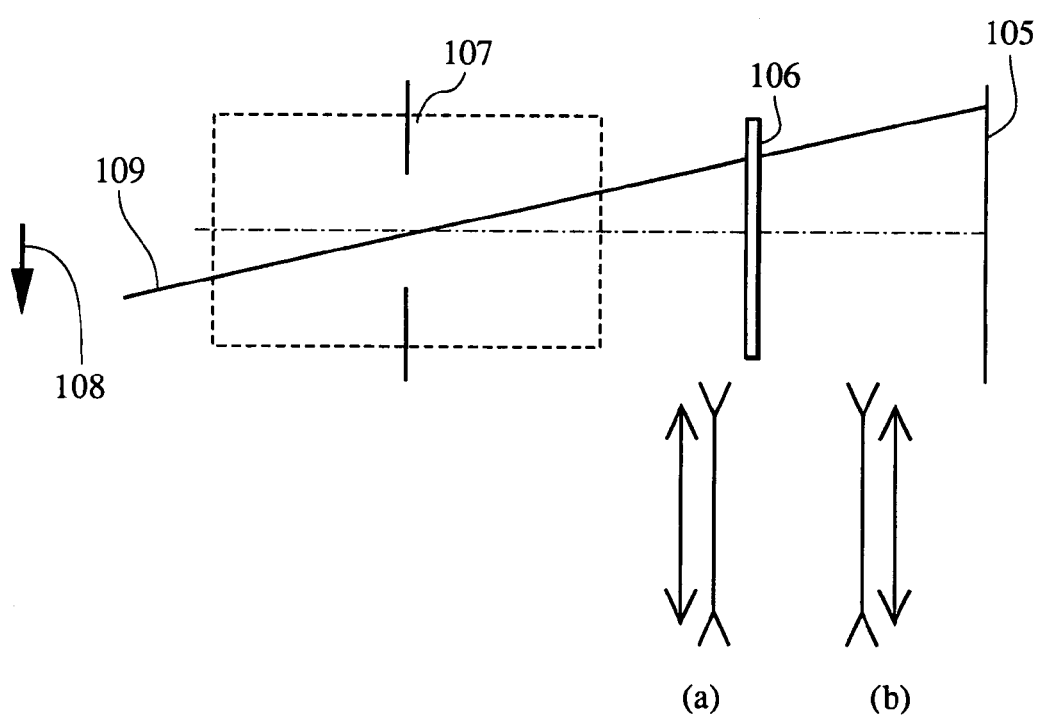
FIG. 3 is a diagram showing the position of a pupil of the optical system and the incident angle of light upon a grating in the first embodiment of the present invention.

In the arrangement of this embodiment, as shown in FIG. 3, the iris (pupil) 107, the diffraction optical device 106, and the image plane 105 are disposed successively in this order from the side nearer to an object 108. A ray of off-axis primary light 109 enters the diffraction optical device 106 at an angle shown in FIG. 3. The two diffraction elements 106a, 106b of the diffraction optical device 106 may be arranged such that the first diffraction element 106a having a positive power is located on the side nearer to the object as indicated by (a) in FIG. 3, or such that the second diffraction element 106b having a negative power is located on the side nearer to the object as indicated by (b) in FIG. 3. As described above in connection with FIG. 2, however, the dependency of diffraction efficiency upon wavelengths is not the same and is asymmetrical between the case of the incident angle being positive and the case of the incident angle being negative. Accordingly, in this embodiment, the first diffraction element 106a having a positive power is arranged nearer to the object than the second diffraction element 106b having a negative power, as indicated by (a) in FIG. 3. By employing such an arrangement, the incident angle of light upon the second negative diffraction element 106b is reduced and a lowering of the diffraction efficiency is suppressed.

In this embodiment, the first diffraction element 106a having a positive power is made of an optical material 1 (having a refractive index nd=1.635 and the Abbe's number vd=23), and the second diffraction element 106b having a negative power is made of an optical material 2 (having a refractive index nd=1.5250 and the Abbe's number vd=47.8). The grating heights of the first and second diffraction elements 106a, 106b are set respectively to d1=6.9×$10^{-3}$ (mm) and d2=9.5×$10^{-3}$ (mm). Then, both the diffraction elements 106a, 106b are arranged adjacent to each other with the air layer interposed between them. The diffraction optical device is constructed as mentioned above, by way of example, in this embodiment, but the kinds of optical materials and the grating heights are not limited to the examples. Also, this embodiment has been described in connection with the case where the diffraction optical device is arranged in an extender for a photographic lens. However, the present invention is not limited to that case, and similar advantages are obtained by applying the technique of this embodiment to any other optical system including a diffraction optical device.

Second Embodiment

Figure 4A:
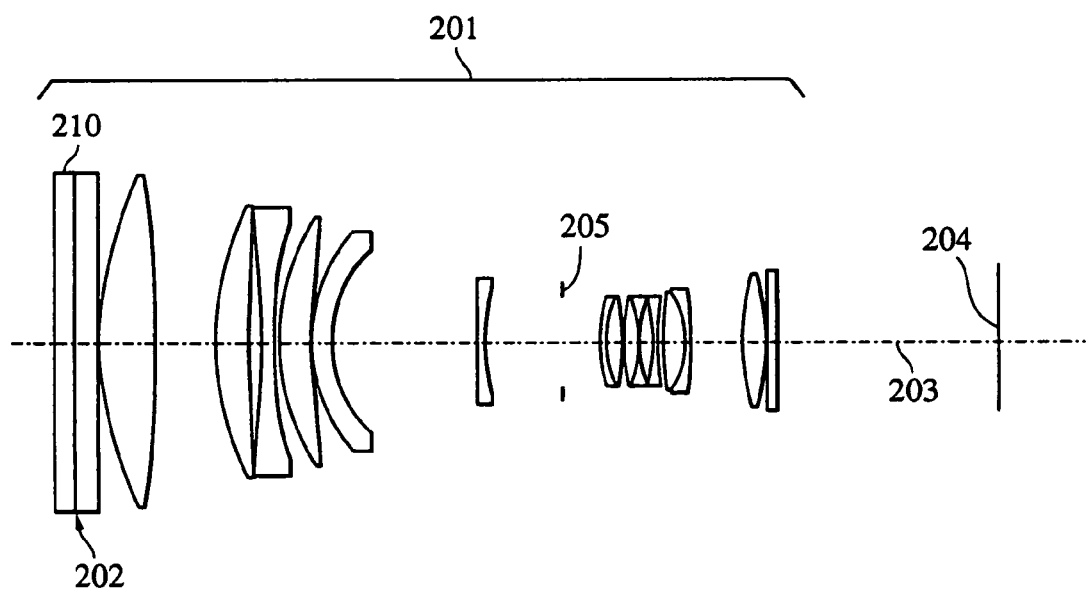
FIG. 4A is a sectional view of an optical system according to a second embodiment of the present invention, and FIG. 4B schematically shows the structure of a diffraction optical device.

FIG. 4A is a sectional view of an optical system according to a second embodiment of the present invention. In FIG. 4A, numeral 201 denotes an optical system including a diffraction optical device 0.202, an optical axis 203, an image plane 204, and an iris 205. This embodiment represents the case where the diffraction optical device is applied to a telephoto lens for a photographic lens.

Figure 4B:
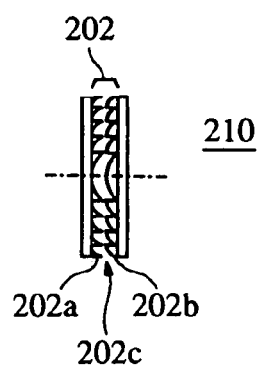

FIG. 4B schematically shows the structure of the diffraction optical device according to this embodiment. As shown in FIG. 4B, a first diffraction element 202a having a negative power and a second diffraction element 202b having a positive power are arranged in an adjacently superimposed relation between two base plates with an air layer 202c interposed between both the diffraction elements.

In this second embodiment, as shown, the first diffraction element 202a having a negative power is arranged on the side nearer to an object. In FIG. 4B, grating portions of the first and second diffraction elements 202a, 202b of the diffraction optical device 202 are illustrated in enlarged scale for clearly showing an arrangement that two gratings (kinoforms) of the first and second diffraction elements 106a, 106b have blazed shapes oriented in opposing directions.

Also, in this second embodiment, the dependency of diffraction efficiency upon wavelengths is asymmetrical, as shown in FIG. 2, between the case of the incident angle being positive and the case of the incident angle being negative.

Figure 5:
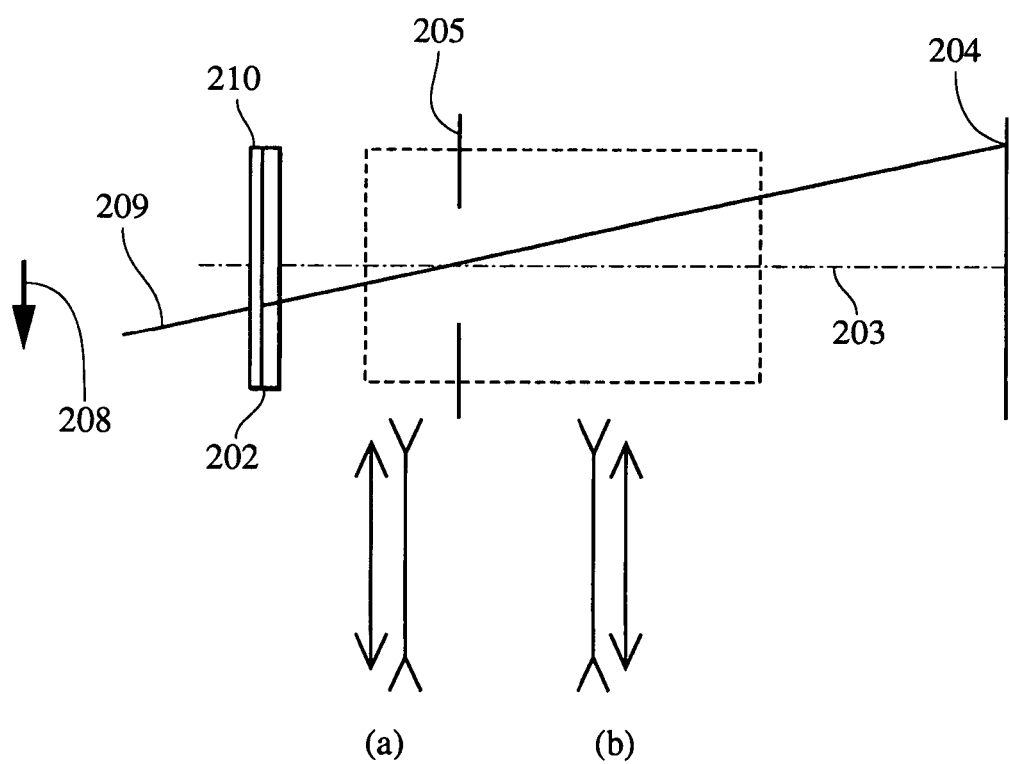
FIG. 5 is a diagram showing the position of a pupil of the optical system and the incident angle of light upon a grating in the second embodiment of the present invention.

In the arrangement of this embodiment, as shown in FIG. 5, the diffraction optical device 202, the iris (pupil) 205, and the image plane 204 are disposed successively in this order from the side nearer to an object 208. A ray of off-axis primary light 209 enters the diffraction optical device 202 at an angle shown in FIG. 5.

The two diffraction elements 202a, 202b of the diffraction optical device 202 may be arranged such that the second diffraction element 202b having a positive power is located on the side nearer to the object as indicated by (a) in FIG. 5, or such that the first diffraction element 202a having a negative power is located on the side nearer to the object as indicated by (b) in FIG. 5. Taking into account the fact that the dependency of diffraction efficiency upon wavelengths is asymmetrical between the case of the incident angle being positive and the case of the incident angle being negative as shown in FIG. 2, however, the incident angle of light upon the second positive diffraction element 202b is reduced and a lowering of the diffraction efficiency is suppressed in this embodiment by arranging the first diffraction element 202a having a negative power nearer to the object than the second diffraction element 202b having a positive power, as indicated by (b) in FIG. 5.

Thus, by arranging the diffraction elements 202a, 202b in the order indicated by (b) in FIG. 5, a lowering of the diffraction efficiency due to the dependency thereof upon the incident angle can be suppressed.

Figure 6A:
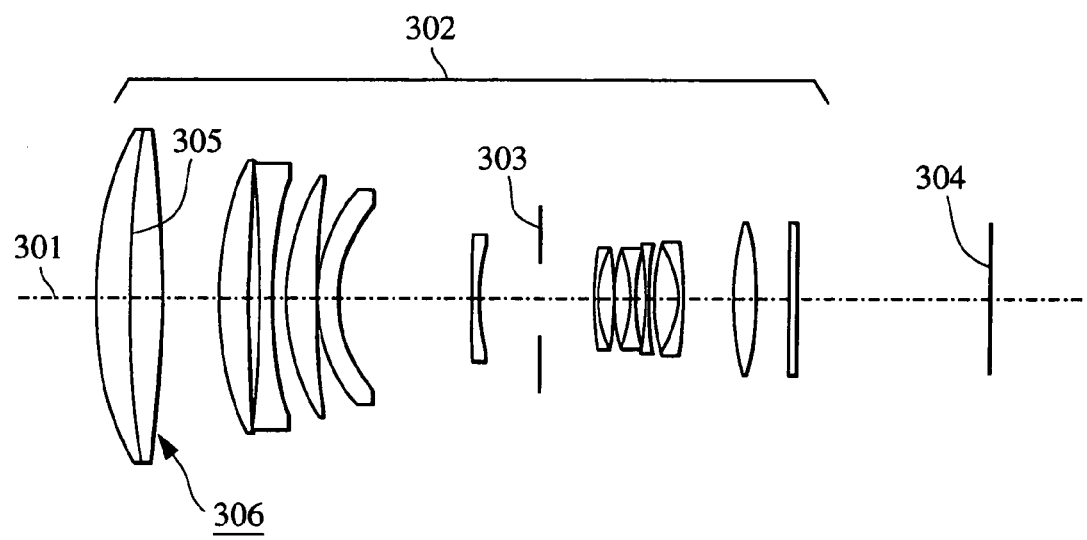
FIG. 6A is a sectional view of an optical system according to a modification of the second embodiment of the present invention, and FIG. 6B schematically shows the structure of a diffraction optical device.

FIG. 6A shows a modification of the second embodiment. In FIG. 6A, numeral 301 denotes an optical axis, 303 denotes an iris, 304 denotes an image plane, and 305 denotes a diffraction optical device. The diffraction optical device 305 shown in FIG. 6A has a structure shown in FIG. 6B. More specifically, a first diffraction element 305a having a negative power and a second diffraction element 305b having a positive power are arranged within a lens device 306 in an adjacently superimposed relation with an air layer 305c interposed between both the diffraction elements.

Figure 6B:
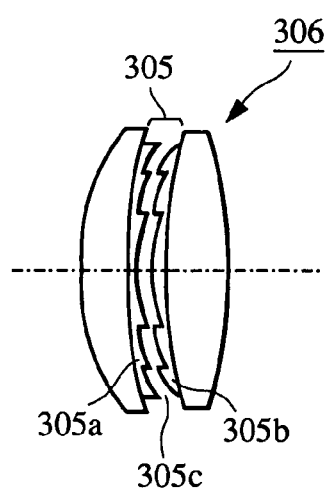
Figure 7A:
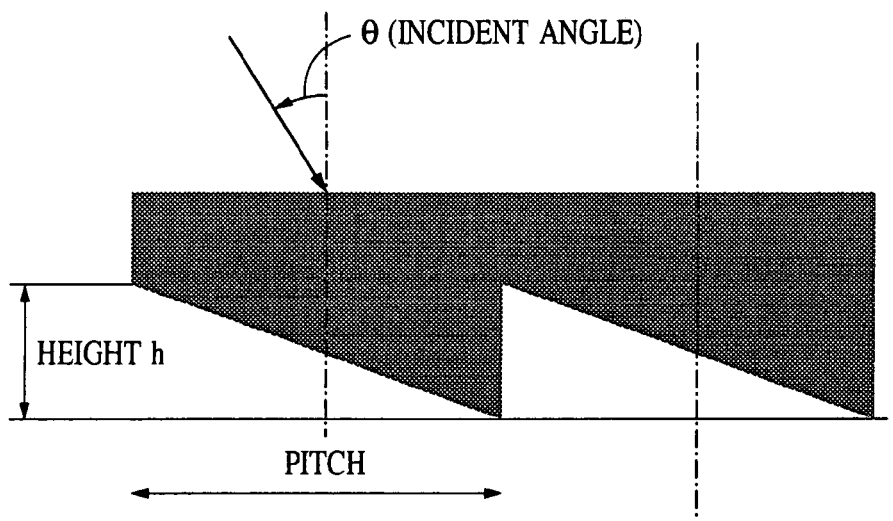
FIG. 7A shows the structure of a single-layer grating of the related art.
Figure 7B:
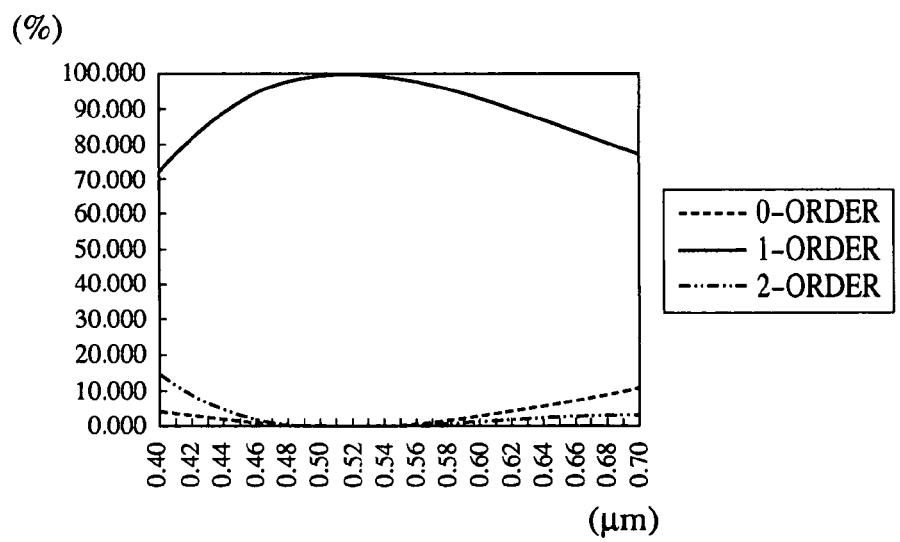
FIG. 7B is a graph showing the dependency of diffraction efficiency of the single-layer 105 grating upon wavelengths.

FIG. 6B depicts that in lens device 306, there is a positive meniscus lens and a positive biconvex lens, with the first diffraction element 305a being disposed on the positive meniscus lens and the second diffraction element 305b being disposed on the positive biconvex lens.

The reason why the first diffraction element 305a having a negative power is arranged nearer to the object than the second diffraction element 305b having a positive power is the same as that in the second embodiment. While the above description has been made in connection with a photographic lens, the present invention not limited to such an application. Also, the present invention is applicable to a diffraction optical device having no power.

According to the first and second embodiments, as described above, a lowering of the diffraction efficiency due to the dependency thereof upon the incident angle of light can be suppressed. It is therefore possible to realize a diffraction optical device having high diffraction efficiency, and an optical system including the diffraction optical device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging optical system comprising:

an iris stop;

a layered diffraction optical member laminated with a plurality of diffraction parts, wherein said layered diffraction optical member is provided in front of said iris stop; and a refraction optical member disposed on a rear side of said iris stop, wherein said layered diffraction optical member includes a first diffraction part of negative power and a second diffraction part of positive power provided behind said first diffraction part, wherein said first diffraction part and said second diffraction part each include a diffraction grating, and said diffraction grating of said first diffraction part is made of a material having a dispersion characteristic different from that of a material from which said diffraction grating of said second diffraction part is made, wherein said layered diffraction optical member is formed to have high diffraction efficiency for diffracted light of a particular order over a visible wavelength range to be used in said imaging optical system, wherein said imaging optical system forms an image on an image plane with light that has passed through said layered diffraction optical member, said iris stop, and said refraction optical member, and wherein said layered diffraction optical member further comprises a positive meniscus lens and a positive biconvex lens, with said first diffraction part being disposed on said positive meniscus lens and said second diffraction part being disposed on said positive biconvex lens.

2. An optical system according to claim 1, wherein each of said first diffraction optical part and said second diffraction optical part comprises a diffraction grating, and wherein the diffraction gratings have blazed shapes oriented in opposing directions.

3. An optical system according to claim 1, wherein no lens of said optical system is present on a front side of said layered diffraction optical member.

4. An optical system according to claim 1, wherein said refraction optical member is a lens element.

* * * * *

UNITED STATES PATENT AND TRADEMARK OFFICE
CERTIFICATE OF CORRECTION

PATENT NO. : 7,016,114 B1  Page 1 of 1
APPLICATION NO. : 09/685042
DATED : March 21, 2006
INVENTOR(S) : Shuichi Kobayashi It is certified that error appears in the above-identified patent and that said Letters Patent is hereby corrected as shown below:

ON THE TITLE PAGE
Item (73), Assignee, "Tokyp" should read --Tokyo--.
Item (30), Foreign Application Priority Data, "11/290057" should read --11-290057--.

COLUMN 6
Line 23, "0.202" should read --202--.

COLUMN 7
Line 18, "FIG. 6B" should read --(FIG. 6B--.
Line 22, "lens." should read --lens.)--.
Line 28, "invention" should read --invention is--.

Signed and Sealed this

Thirteenth Day of March, 2007

JON W. DUDAS
*Director of the United States Patent and Trademark Office*